(12) United States Patent
Park et al.

(10) Patent No.: US 9,872,051 B2
(45) Date of Patent: Jan. 16, 2018

(54) METHOD AND APPARATUS FOR TRANSCEIVING DATA FOR MULTIMEDIA TRANSMISSION SYSTEM

(71) Applicant: Samsung Electronics Co., Ltd., Suwon-si, Gyeonggi-do (KR)

(72) Inventors: Kyung-Mo Park, Seoul (KR); Sung-Ryeul Rhyu, Yongin-si (KR); Sung-Oh Hwang, Yongin-si (KR); Jae-Yeon Song, Seoul (KR)

(73) Assignee: Samsung Electonics Co., Ltd., Suwon-si (KR)

( * ) Notice: Subject to any disclaimer, the term of this patent is extended or adjusted under 35 U.S.C. 154(b) by 0 days.

(21) Appl. No.: 14/397,055

(22) PCT Filed: Apr. 25, 2013

(86) PCT No.: PCT/KR2013/003582
§ 371 (c)(1),
(2) Date: Oct. 24, 2014

(87) PCT Pub. No.: WO2013/162312
PCT Pub. Date: Oct. 31, 2013

(65) Prior Publication Data
US 2015/0089560 A1    Mar. 26, 2015

Related U.S. Application Data

(60) Provisional application No. 61/638,048, filed on Apr. 25, 2012.

(51) Int. Cl.
*H04N 7/173*     (2011.01)
*H04N 21/236*   (2011.01)
*H04L 29/06*    (2006.01)

(52) U.S. Cl.
CPC ... *H04N 21/23605* (2013.01); *H04L 65/4076* (2013.01); *H04L 65/607* (2013.01)

(58) Field of Classification Search
None
See application file for complete search history.

(56) References Cited

U.S. PATENT DOCUMENTS 5,486,864 A * 1/1996 Zdepski ............ 348/423.1
5,565,923 A   10/1996 Zdepski
(Continued)

FOREIGN PATENT DOCUMENTS

CN    101682622 A    3/2010
JP    2002-158714 A    5/2002
(Continued)

OTHER PUBLICATIONS

Sakae Okubo, "3rd Edition H. 264/AVC textbook first edition H. 264/AVC Textbook", In Press R &D Corporation,1st edition, Jan. 1, 2009.
(Continued)

*Primary Examiner* — William J Kim
(74) *Attorney, Agent, or Firm* — Jefferson IP Law, LLP

(57) ABSTRACT

A method and an apparatus for transmitting data in a multimedia transmission system are provided. The method includes receiving, from an encapsulation function layer, a second data unit having one or more first data units, configuring payload header information, the payload header information including a payload type and configuration information, by analyzing header information of the second data unit, configuring one or more payloads from the second data unit based on sizes of the one or more first data units, configuring a multimedia data packet by combining payload header information corresponding to each of the one or more payloads, and transmitting the multimedia data packet to a
(Continued)

counterpart entity. Each of the one or more payload includes at least one payload element, the type of which is selected from among a first type, a second type, a third type, a fourth type, and a fifth type.

7 Claims, 3 Drawing Sheets

(56) References Cited

U.S. PATENT DOCUMENTS

| | | | |
|---|---|---|---|
| 7,283,502 B1 | 10/2007 | Abraham et al. | |
| 2001/0042114 A1* | 11/2001 | Agraharam | G06F 17/30256 709/223 |
| 2005/0071491 A1 | 3/2005 | Seo | |
| 2006/0053209 A1 | 3/2006 | Li | |
| 2007/0005795 A1* | 1/2007 | Gonzalez | G06F 17/30017 709/232 |
| 2008/0037956 A1 | 2/2008 | Nallur et al. | |
| 2008/0040666 A1* | 2/2008 | Wang | G06Q 30/02 715/210 |
| 2008/0162644 A1* | 7/2008 | Krishnan | G06F 9/546 709/206 |
| 2008/0225735 A1* | 9/2008 | Qiu | H04L 1/0009 370/252 |
| 2009/0003247 A1* | 1/2009 | Katis et al. | 370/260 |
| 2009/0003558 A1 | 1/2009 | Katis et al. | |
| 2009/0041115 A1 | 2/2009 | Ramesh et al. | |
| 2011/0010608 A1 | 1/2011 | Kim et al. | |
| 2011/0255558 A1 | 10/2011 | Hwang et al. | |
| 2011/0293021 A1 | 12/2011 | Kotalwar et al. | |
| 2012/0005303 A1 | 1/2012 | Hwang et al. | |
| 2012/0054370 A1 | 3/2012 | Tsubakihara | |
| 2014/0317664 A1* | 10/2014 | Park | H04N 21/23614 725/109 |

FOREIGN PATENT DOCUMENTS

| | | |
|---|---|---|
| JP | 2005-110244 A | 4/2005 |
| JP | 2012-54788 A | 3/2012 |
| KR | 1020090027683 A | 3/2009 |
| KR | 1020110005660 A | 1/2011 |
| KR | 1020110117033 A | 10/2011 |
| RU | 2115261 C1 | 7/1998 |
| WO | 2011/108908 A2 | 9/2011 |

OTHER PUBLICATIONS

Anonymous: Technology under Considerations on MPEG Media Transport, 98. MPEG Meeting; Nov. 28, 2011-Dec. 2, 2012; Geneva; (Motion Picture Expert Group or ISO/IEC JTC1/SC29/WG11) No. N12335, Dec. 3, 2011, XP030018830.

Kyungmo Park et al: Contribution to MMTEE#8 (D.1 Layer Design), 98. MPEG Meeting; Nov. 28, 2011-Dec. 2, 2011; Geneva; (Motion Picture Expert Group or ISO/IEC JTC1/SC29/WG11) No. m21524, Oct. 23, 2011, XP030050087.

* cited by examiner

METHOD AND APPARATUS FOR TRANSCEIVING DATA FOR MULTIMEDIA TRANSMISSION SYSTEM

CROSS-REFERENCE TO RELATED APPLICATION(S)

This application is a U.S. National Stage application under 35 U.S.C. § 371 of an International application filed on Apr. 25, 2013 and assigned application number PCT/KR2013/003582, which claimed the benefit of a U.S. Provisional application filed on Apr. 25, 2012 in the U.S. Patent and Trademark Office and assigned Ser. No. 61/638,048, the entire disclosure of which is hereby incorporated by reference

TECHNICAL FIELD

The present disclosure relates to a multimedia transmission system. More particularly, the present disclosure relates to a method and apparatus for transmitting and receiving multimedia data.

BACKGROUND

The term 'multimedia service' may refer to call services such as Video Call, streaming services such as Video on Demand (VOD) service, and/or services such as Multicast and Broadcast Service. Real-time multimedia services may be divided into call services, interactive services and streaming services depending on the service type, and may also be divided into unicast, multicast and broadcast depending on the number of participating users.

A related-art broadcast network usually uses Moving Picture Experts Group (MPEG)-2 Transport Stream (MPEG-2 TS), for transmission of multimedia content. MPEG-2 TS is used as a typical transmission technology for transmitting a bit stream, with which multiple broadcast programs and/or multiple coded video bit streams are multiplexed, in an error-ridden transmission environment. MPEG-2 TS is suitable for use in digital TV broadcasting or the like in the multimedia age.

MPEG-2 TS may have a few limitations in supporting multimedia services. In other words, MPEG-2 TS may have limitations such as one-way communication, inefficiency of transmission due to a fixed frame size, and unnecessary overhead which occurs when data is transmitted using the transport protocol and Internet Protocol (IP) that are specific to audio/video.

Therefore, MPEG has proposed an MPEG Media Transport (MMT) standard as one of the multimedia transmission technologies for supporting multimedia services based on the MPEG technology. For example, the MMT standard may be applied to efficiently transmit hybrid content over a heterogeneous network. The term 'hybrid content' as used herein may refer to a collection of content having multimedia elements corresponding to video/audio/applications. The heterogeneous network may be, for example, a network in which a broadcasting network and a mobile communication network coexist.

The MMT standard aims at defining an IP-friendly transmission technology which is the basic technology in a transmission network for multimedia services. To this end, there is a need for a structure of an MMT transport packet for more efficiently delivering logical data objects in a variety of formats, including coded media data, in a changing multimedia service environment.

Other aspects, advantages, and salient features of the disclosure will become apparent to those skilled in the art from the following detailed description, which, taken in conjunction with the annexed drawings, discloses various embodiments of the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently transmitting and receiving coded media data in a multimedia transmission system.

Another aspect of the present disclosure is to provide a method and apparatus for transmitting and receiving logical data objects in a variety of formats in a multimedia transmission system.

Another aspect of the present disclosure is to provide a method and apparatus for configuring a heterogeneous multimedia data packet in a broadcasting system that supports multimedia services based on an Internet Protocol (IP), such as an IP address.

In accordance with an aspect of the present disclosure, a method for transmitting data in a multimedia transmission system is provided. The method includes receiving, from an encapsulation function layer, a second data unit having one or more first data units, configuring payload header information, the payload header information including a payload type and configuration information by analyzing header information of the second data unit, configuring one or more payloads from the second data unit based on sizes of the one or more first data units, configuring a multimedia data packet by combining payload header information corresponding to each of the one or more payloads, and transmitting the multimedia data packet to a counterpart entity, wherein each of the one or more payloads includes at least one payload element corresponding to any one of a first type including one of the one or more first data units, a second type including header information of one of the one or more first data units, a third type including header information of one of the one or more first data units and part of data or only part of data, a fourth type including header information of the second data unit, and a fifth type including the entirety of the second data unit.

In accordance with another aspect of the present disclosure, a method for receiving data in a multimedia transmission system is provided. The method includes receiving, from a counterpart entity, a multimedia data packet having a payload and payload header information including a payload type and configuration information, and detecting, from the multimedia data packet, one or more first data units generated by an encapsulation function layer and at least a part of a second data unit having the one or more first data units, wherein the payload includes at least one payload element corresponding to any one of a first type including one of the one or more first data units, a second type including header information of one of the one or more first data units, a third type including header information of one of the one or more first data units and part of data or only part of data, a fourth type including header information of the second data unit, and a fifth type including the entirety of the second data unit.

In accordance with another aspect of the present disclosure, an apparatus for transmitting data in a multimedia transmission system is provided. The apparatus includes a data generation unit configured to output a second data unit having one or more first data units, a data configuration unit configured to configure payload header information, the payload header information including a payload type and configuration information by analyzing header information of the second data unit, to configure one or more payloads from the second data unit based on sizes of the one or more first data units, and to configure a multimedia data packet by combining payload header information corresponding to each of the one or more payloads, and a data transmission unit configured to transmit the multimedia data packet to a counterpart entity, wherein the one or more payloads includes at least one payload element corresponding to any one of a first type including one of the one or more first data units, a second type including header information of one of the one or more first data units, a third type including header information of one of the one or more first data units and part of data or only part of data, a fourth type including header information of the second data unit, and a fifth type including the entirety of the second data unit.

In accordance with yet another aspect of the present disclosure, an apparatus for receiving data in a multimedia transmission system is provided. The apparatus includes a reception unit configured to receive, from a counterpart entity, a multimedia data packet having a payload and payload header information including a payload type and configuration information, and an interpretation unit configured to detect, from the multimedia data packet, one or more first data units generated by an encapsulation function layer and at least a part of a second data unit having the one or more first data units, wherein the payload may include at least one payload element corresponding to any one of a first type including one of the one or more first data units, a second type including header information of one of the one or more first data units, a third type including header information of one of the one or more first data units and part of data, or only part of data, a fourth type including header information of the second data unit, and a fifth type including the entirety of the second data unit.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A hierarchical structure defined in the Motion Picture Experts Group (MPEG) Media Transport (MMT) standard will be described herein below. Various embodiments of the present disclosure provide the structure of a multimedia data packet. To this end, a detailed description will be made of layers for generating a multimedia data packet in the hierarchical structure defined in the MMT standard. The term 'multimedia data packet' as used herein may refer to a delivery frame for an MMT service.

An MMT Protocol (MMTP) defines an application layer protocol for delivering a delivery frame configured in an MMT Payload Format (PF) over an Internet Protocol (IP) network. An MMT payload is designed to be efficiently delivered by being configured in an MMT payload format. To efficiently deliver MPEG media data over heterogeneous IP networks, MMT defines encapsulation formats, delivery protocols, and signaling message formats.

Figure 1:
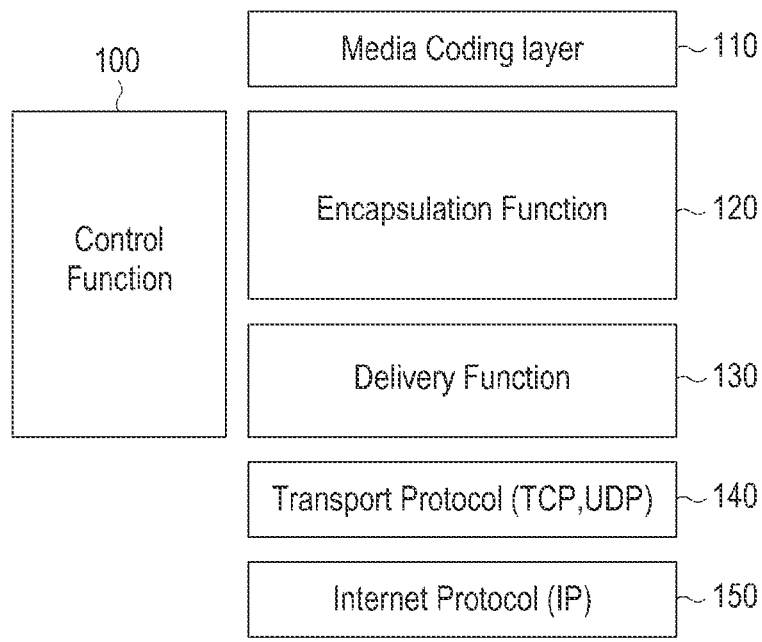
FIG. 1 illustrates a hierarchical structure of an MPEG Media Transport (MMT) system according to an embodiment of the present disclosure.

FIG. 1 illustrates a hierarchical structure of an MMT system according to an embodiment of the present disclosure.

Referring to FIG. 1, shown are a media coding layer 110, an encapsulation function layer (Layer E) 120, a delivery function layer (Layer D) 130, a transport protocol layer 140, an Internet Protocol (IP) layer 150, and a control function layer (Layer C) 100, which are for configuring a multimedia data packet and transmitting the configured multimedia data packet.

In accordance with an embodiment of the present disclosure, the media coding layer 110 and the encapsulation function layer 120 may operate as a multimedia data generation unit for generating multimedia data that is based on multimedia content and/or multimedia services. The delivery function layer 130 may operate as a multimedia data configuration unit for configuring a multimedia data packet based on the multimedia data received from the multimedia data generation unit. The delivery function layer 130 corresponding to the multimedia data configuration unit may configure header information by identifying at least one multimedia data provided from the multimedia data generation unit, and may configure a multimedia data packet by combining the header information with the least one multimedia data.

The multimedia data, which may be compressed in the media coding layer 110, may be packetized in a form similar to a file format by the encapsulation function layer 120. The encapsulation function layer 120 may generate data segments, which are small units for an MMT service, by receiving the coded media data provided from the media coding layer 110 or the stored media data, and may generate access units for an MMT service using the data segments. The encapsulation function layer 120 may generate a packet format for generation and/or storage and transmission of hybrid content by combining and/or dividing the access units.

The delivery function layer 130 may convert at least one data unit output from the encapsulation function layer 120 into an MMT payload format and then may add an MMT transport packet header thereto to configure an MMT transport packet, or may configure a Real-Time Protocol (RTP) packet using an RTP which is the existing transport protocol.

The packets configured in the delivery function layer 130 may be finally IP-packetized in the IP layer 150 after undergoing configuration by the transport protocol layer 140, such as User Datagram Protocol (UDP) or Transport Control Protocol (TCP). The transport protocol layer 140 and the IP layer 150 may operate as a data transmission unit. The control function layer 100, which is optional, may generate control information or signaling information used for transmission of data, may add the generated information to data, may transmit the data, and/or may transmit the data through a separate signaling means.

An MMT payload format generated in the delivery function layer 130 may define a logical structure of at least one media unit to be delivered, by means of the MMT protocol or the RTP. An MMT payload may be specified by a payload format for delivering the encapsulated data unit or other information by MMT layer protocols or other existing application transport protocols. The MMT payload may provide information about streaming and information about file transfer. In streaming, a data unit may be an MMT Media Fragment Unit (MFU) or an MMT Processing Unit (MPU). In file transfer, a data unit may be an MMT asset and an MMT package.

Figure 2:
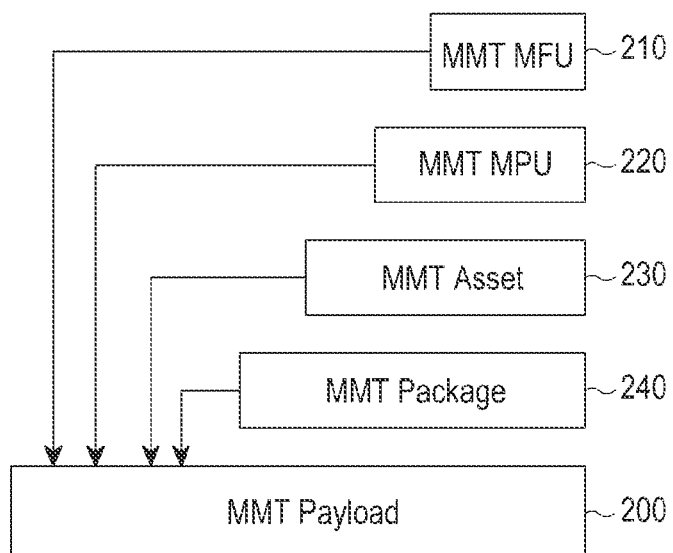
FIG. 2 illustrates a structure of an MMT payload according to an embodiment of the present disclosure.

FIG. 2 illustrates a structure of an MMT payload according to an embodiment of the present disclosure.

Referring to FIG. 2, an MMT payload 200 may be configured to include at least one of at least one MMT MFU 210, at least one MMT MPU 220, at least one MMT asset 230, and at least one MMT package 240.

The MFU 210 may be a common container format including coded media data, which is independent of any media codec, and can be independently processed by a media decoder. The MFU 210, which represents part of segmented data of the MPU 220, may be the minimum unit that can be decoded independently. As an example, if coding is performed by using one frame as an access unit, the MFU 210 may be one video frame. In another case, the MFU 210 may be one slice included in one frame.

The MPU 220, which is a container format including one or more MFUs and additional delivery and processing-related information, may include a variety of numbers of MFUs generated from a plurality of different access units. The MPU 220, which may be a coded media data unit that can be completely and independently processed by an MMT compliant entity, may have a specific size, e.g., one Group of Picture (GOP) in the case of video, depending on the application environment. As an example, the MPU 220 may have and/or may consist of a plurality of picture frames constituting one GOP, e.g., a 1 second video, and the PFU 210 may include each picture frame.

The MMT asset 230, which is a data entity having one or more MPUs, may be the largest data unit, to which the same composition information and transport characteristics are applied. The MMT asset 230 may include only one type of data, including packaged or multiplexed data. For example, at least a part of an Elementary Stream (ES) of audio, at least a part of an ES of video, at least a part of an MPEG-U (User Interface) widget package, at least a part of an MPEG-2 TS, at least a part of an MPEG-4 (MP4) file, and all or at least a part of an MMT package may each be an MMT asset 230.

The ES, which is defined by a specific media codec, may be logically one or more MMT assets. The MMT asset 230 supporting a layered codec and a multi-view codec may overlap with other MMT assets.

MMT Composition Information (MMT-CI) may be the information defining a spatial and temporal relationship of MMT assets, and MMT Transport Characteristics (MMT-TC) may define Quality of Service (QoS) needed for delivery of MMT assets. An MMT-TC may be expressed as an Asset Delivery Characteristic (ADC), for a specific delivery environment.

The MMT package 240 may be defined as a collection of coded media data and its related information, which are processed by an MMT compliant entity.

Figure 3:
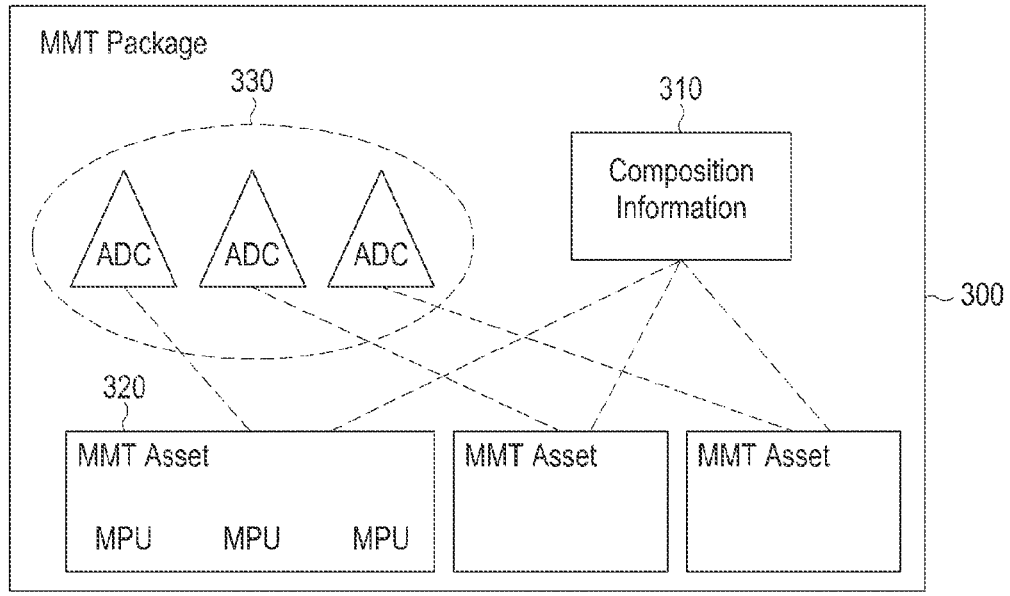
FIG. 3 illustrates a logical structure of an MMT package according to an embodiment of the present disclosure.

FIG. 3 illustrates a logical structure of an MMT package according to an embodiment of the present disclosure.

Referring to FIG. 3, an MMT package 300 may have, and/or consist of, at least one MMT asset 320, MMT composition information 310, and at least one ADC 330 representing at least one MMT transport characteristic. The MMT package 300, which may be similar to the MMT package 240 illustrated in FIG. 2, may include description information such as an identifier, and locations of the MMT assets 320, and the MMT assets 320 in the MMT package 300 may be multiplexed and/or concatenated.

The MMT package 300 may be processed in units of MPUs, and the MMT asset 320 may be a collection of one or more MPUs having the same MMT asset ID. The transport characteristics related to each MMT asset 320 may be expressed by the ADC 330. The ADC 330 may be used, by an entity of and/or for packetizing an MMT package, to configure parameters of an MMT payload and below-described header information of an MMT packet.

Among the logical entities that can be included in the MMT package, the MPU may include header fields that are based on the given definition and some of these fields may be used for processing the MPU. In a case where the outer parts of the boundaries of MFUs in a payload of MPUs are cut off, if the packet is lost, an error may be propagated longer. In media data requiring a low delay, an MFU needs to be immediately transmitted at the time of its generation. In this case, to prevent the transmission delay, the transmission order may be determined to transmit header field information of the MPU after transmitting the generated PFU data.

Given the above characteristics, an MMT payload should be configured to maintain compatibility between MPU packets and MFU packets.

Figure 4:
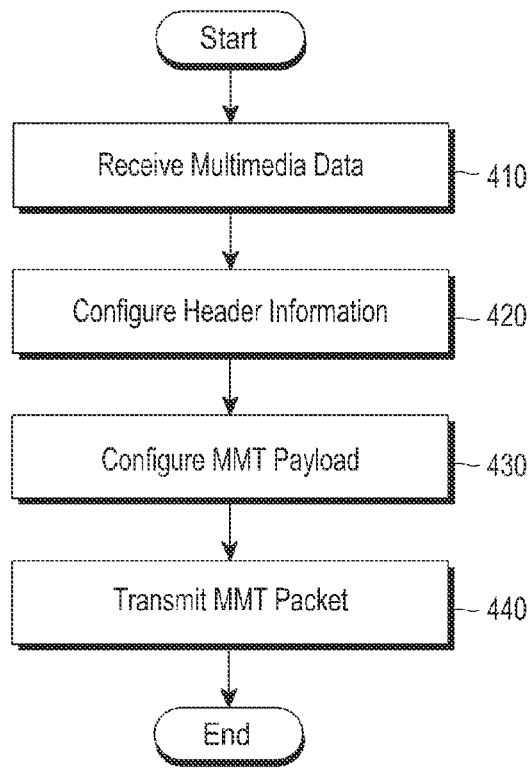
FIG. 4 illustrates a flowchart for configuring and transmitting a multimedia data packet including an MMT payload in an MMT system according to an embodiment of the present disclosure.

FIG. 4 illustrates a flowchart for configuring and transmitting a multimedia data packet including an MMT payload in an MMT system according to an embodiment of the present disclosure. The operations shown in FIG. 4 may be performed by the delivery function layer 130 from among the layers in FIG. 1.

Referring to FIG. 4, in operation 410, the delivery function layer 130 may receive multimedia data provided from the encapsulation function layer 120. The encapsulation function layer 120 may provide multimedia data used to configure a multimedia data packet, and information related to each multimedia data.

In operation 420, the delivery function layer 130 may configure header information, such as payload header information, related to an MMT payload of the multimedia data packet based on the header information of the multimedia data. As an example, the payload header information may provide a length of an MMT payload, a type of payload data, information related to fragmentation and aggregation, and any other similar and/or suitable type of information that may be included in the payload header information, and the payload header format may be defined by the system operator or the protocol standard.

In operation 430, the delivery function layer 130 may generate a payload of a multimedia data packet for delivery of multimedia data, or in other words, the delivery function layer 130 may configure an MMT payload by combining at least a part of the multimedia data received in operation 410 with the header information configured in operation 420 in order to generate an MMT packet.

In operation 440, an MMT packet, such as the MMT packet generated according to operation 430, which is a multimedia data packet including the MMT payload, may be may be transmitted to a counterpart entity, e.g., a receiver, through a given transport protocol.

A description will now be made of a detailed procedure for configuring a multimedia data packet by a delivery function layer in charge of transmission of multimedia data for MMT services, which is proposed in an embodiment of the present disclosure, and also made of and/or according to a payload format. Specifically, a transport data structure that is based on the type of the data generated in the encapsulation function layer 120 may be provided. For configuration of a multimedia data packet, payload header information to be recorded in a header region and multimedia data to be recorded in a payload region may be generated according to a given format.

Figure 5:
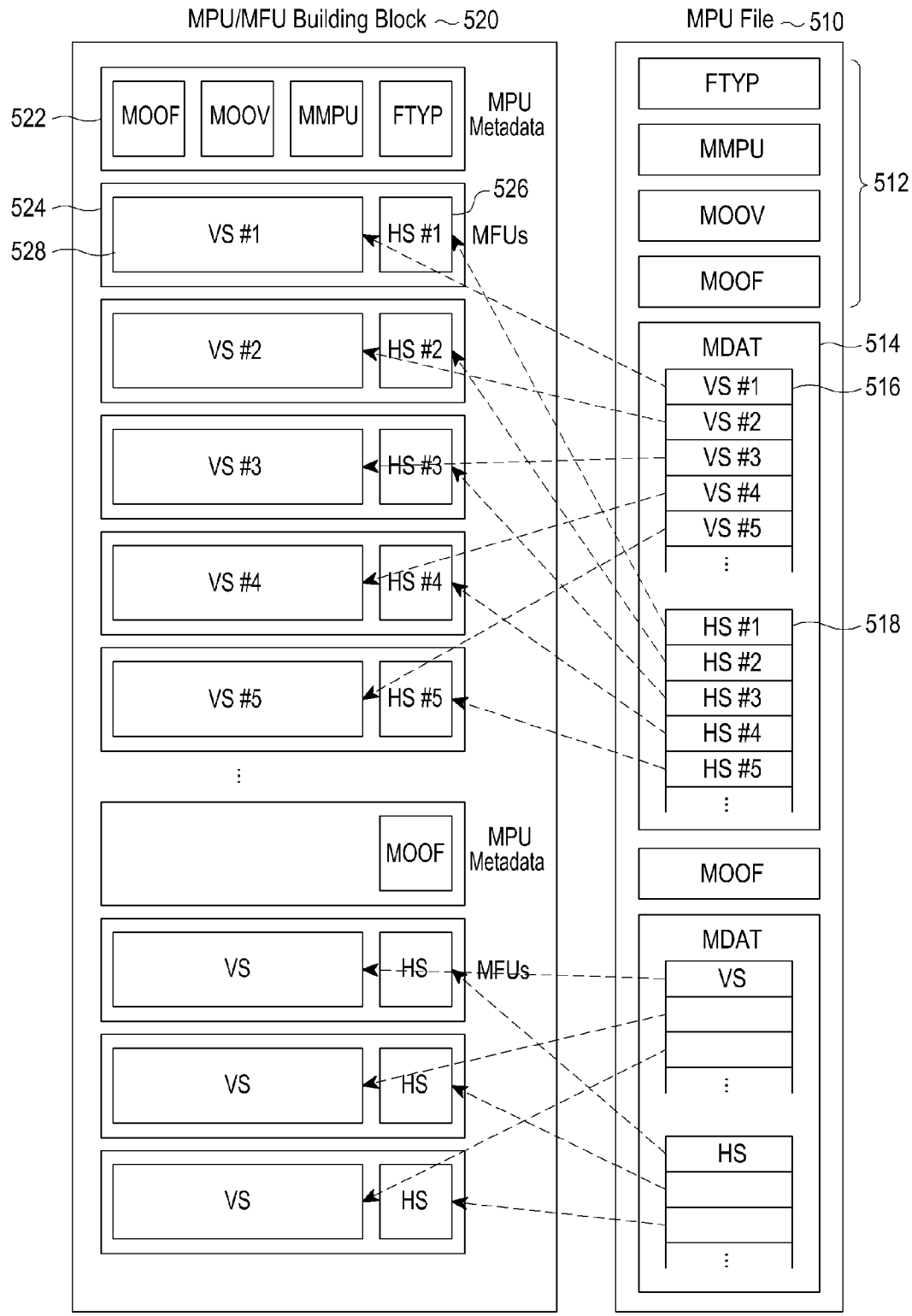
FIG. 5 illustrates an operation of generating a multimedia data packet according to an embodiment of the present disclosure.

FIG. 5 illustrates an operation of generating a multimedia data packet according to an embodiment of the present disclosure.

Referring to FIG. 5, an MPU file 510 may be data that the encapsulation function layer desires to transmit, and an MPU/MFU building block 520 has a data structure for configuring transmission data. The MPU file 510 may include header information 512 such as a File Type (FTYP) box indicating a type of a file, an MMPU box indicating a structure of an MPU, an MOOV box indicating codec setting information, and Movie Fragment (MOOF) box; and an MDAT box 514 having Video Samples (VSs) 516 and MMT Hint Samples (HSs) 518. The MMPU box indicates that a type of the data stored in the MDAT box is MPU, and the MOOV box contains information about a media frame stored in the MDAT box. The MPU/MFU building block 520 may include MPU metadata 522 such as FTYP, MMPU, MOOV and MOOF, and MFUs 524 having related HSs 526 and VSs 528.

An MMT payload may be configured based on the MPU/MFU building block 520, and carried or transmitted in an MMT packet.

A procedure for configuring an MMT payload may be as follows.

A data configuration unit may analyze data 510 in the form of an MPU file, which is provided from a data generation unit and desired to be transmitted, to determine type information, configuration information of an MPU, setting information of a codec, starting point and size and/or length information of data, from the header information 512 of the MPU data 510. The data configuration unit may analyze the structure of MFUs 516, such as the MFUs corresponding to VSs in FIG. 5, and MFU HSs 518 constituting the MPU data 510, to determine an MFU header containing the size, mutual importance and interconnection information of each MFU such as information on the length or the like, and MFU data which is actual media data, and may also analyze the size of each MFU through the MFU HS 518 indicating the starting offset and length of each MFU.

Based on the analyzed MPU format, the MPU/MFU building block 520 for configuring a transport packet may be configured. The MFU HS 518 may be an MFU header of the MPU/MFU building block 520.

The data configuration unit may configure each MFU as a transport unit based on the size of each MFU, which is analyzed from the MFU HS 518. In this case, depending on the size of the MFU, at least one payload may be configured. The start, middle or end of each payload may be indicated by start_end_indicator, which is optional bits. The MPU metadata 522 may also be treated as one configuration unit of the MPU/MFU building block 520.

The data type of each payload element may be presented as follows:

i. The MPU metadata 522 which may indicate a type of one payload, having at least one of FTYP, MMPU, MOOV, MOOF and MDAT, is called MPU_Partial( ), and may be configured to include only the MPU header;

ii. If one MFU is configured as one payload, the type of the payload is called MFU_set( );

iii. In a case where one MFU is configured as multiple payloads, the type of each payload is MFU_Partial( ) if the MFU includes only the MFU header, and the type of each payload is MFU_chunk( ) if the MFU includes an MFU header and part of the MFU data, or includes part of the MFU data;

iv. MPU_Partial( ) may indicate the type of a payload that includes only the MPU header; and v. MPU_Set( ) may indicate the type of a payload that completely includes an MPU.

Shown below is syntax of an MMT payload according to an embodiment of the present disclosure. The below MMT payload format may be used for UDP transport, exchange of point-to-point chunks, and transport of files.

```
MMT_Payload( )
{
    bit(N) type;
    bit(N) asset_id;
    switch (type) {
    case 0:
        //configuration;
        if (asset_id==0) {
        //package configuration data
        } else {
        //asset configuration data
        }
```

-continued

```
        break;
    case 1:
        MFU_Partial( );
        break;
    case 2:
        MFU_chunk( );
        break;
    case 3:
        MFU_set ( );
        break;
    case 4:
        MPU_Partial( );
        break;
    case 5:
        MPU_Set( );
        break;
    ...
}
```

As described above, an MMT payload may include a type field indicating a data type of the payload, and an asset_id indicating an identifier of an asset to which the payload, such as the MPU and/or the MFU, belongs. The asset_id may exist to multiplex an MMT bit stream. The asset_id may be omitted if the MMT payload is delivered through, i.e. via, RTP and a single asset is used.

Depending on the type field, the following various cases of elements may be included in the MMT payload.

Case 0 may be used if the MMT payload contains configuration data of the data to be transmitted. If asset_id=0, the MMT payload may include package configuration data. Otherwise, asset configuration data may be included.

An MFU_Partial( ) element corresponding to case 1 may be used when the MMT payload carries configuration data, such as header information, of the MFU data. An MFU_chunk( ) element corresponding to case 2 may be used when the MMT payload contains part of the MFU data together with configuration data, such as the header information, of the MFU data, or carries all or part of the MFU data. An MFU_set( ) element corresponding to case 3 may be used when the MMT payload contains all of the MFU data, including the header and the data. An MPU_Partial( ) element corresponding to case 4 may be used when the MMT payload contains the MPT data. An MPU_Set( ) element corresponding to case 5 may be used when the MMT payload contains all of the MPU data, including the header and the data.

Additionally, the MMT payload may further include other units such as a file unit, signaling information of the control layer, and a protection message.

MFU_Partial( ) may be defined to be a set of all of headers that are added to a start of payload bytes and defined in the MFU, when the size of the MFU exceeds the size of the Maximum Transmission Unit (MTU).

MFU_chunk( ) may be defined to be a middle or a last part of a payload of the MFU for the headers transmitted in the MFU_Partial( ) packets.

MFU_set( ) may be defined to be a packet that includes a predetermined number of complete MFUs.

MPU_Partial( ) may be defined to be a set of all of headers that are added to the additional MFU_set element that is added to the optional MFU_Partial( ) element, and that are defined in the MPU. The presence/absence of the additional elements may be determined depending on the remaining bytes and the MFU length of the packet.

A description will now be made of examples of the MPU and MFU elements, together with the mapping between the MMT payload format and the MMT transport packet. A description of the parameter fields that are known in the art or that have nothing to do with various embodiments of the present disclosure will be omitted herein, but it should be noted that such parameter fields do not limit the scope of the present disclosure.

The following represents an example of an MFU element.

```
mmt_mfu_element( )
{
    ...
    optional bit(2) start_end_indicator;
    optional bit(1) rap_fragment_indicator;
    optional bit(N) layer_dependency_info;
    optional bit(N) scrambling_key_index;
    payload( );
}
```

In the above example, start_end_indicator may be optional bits indicating that the payload is a start, middle or end of an MFU. Additionally, start_end_indicator may indicate that the MFU includes Random Access Point (RAP) data, and may include optimal bits indicating a start and/or end position where the data is to be decoded, and rap_fragment_indicator may be optional bits indicting an address of a start point of the data that can be directly decoded, if the payload contains a start point of the randomly accessible data.

Also, scrambling_key_index may contain information about a series of values capable of decrypting encryption, if the payload is encrypted.

Furthermore, layer_dependency_info may be information indicating the dependency between picture layers. Additionally, it may further include layer identifiers (LayerIDs), a dependency count, signal rolling keys, similar to a MPEG-2 TS packet, and the like.

The following represents an example of an MPU element.

```
mmt_mpu_element(multiple, timing)
{
optional bit(2) start_end_indicator;
bit (1) multiple_mfu_flag;
bit (1) no_mfu
bit (1) timing_flag;
bit(1) codec_update_flag;
bit(1) event_list_flag;
bit(1) clock_map;
bit(1) headers_first;
bit(1) multiple_aus_flag;
if (codec_update_flag) {
        bit(16) codec_config_size;
        bytes(codec_config_size) codec_config_data;
        bit(8) downcouter ;//processing delay (remove)
}
if (event_list_flag) {
        bit(16) num_events;
        for (i=0; i<num_events; i++) {
        ... //eventdata
        }
}
if (multiple_mfu_flag) {
        bit(N) num_MFUs;
} else {
        num_MFUs = 1;
        headers_first = 0;
        multiple_aus_flag = 0;
}
if (timing_flag) {
        optional bit(timestamps_bits) base_timestamp;
        if (clock_map) {
                bit(64) clock_ref;
        }
```

-continued

```
        optional bit(ts_inc_bits) ts_increment;
        optional bit(2) constant_flag ;
        optional bit(N) interval ;
        if (ts_inc_factor) ts_increment *= ts_inc_factor;
    }
    for (i=0; i<num_MFUs; i++) {
        optional bit(N) decode_order_number;
        if (timing && (!i \\ multiple_aus_flag) ) {
            optional bit(N) dts_diff;
            optional bit(N)
            composition_timestamp_offset;
            mfu_dts = base_timestamp +
            dts_diff * ts_increment;
            mfu_cts    =    base_timestamp    +
composition_timestamp_offset * ts_increment;
        }
        if (multiple_mfu_flag)
            optional bit(N) mfu_size;
        if (!headers_first) mmt_mfu_element( );
    }
    if (headers_first) {
        for (i=0; i<num_MFUs; i++) {
            mmt_mfu_element( );
        }
    }
}
```

In the above example, start_end_indicator may be optional bits indicating that the payload is a start, middle or end of an MPU, and multiple_mfu_flag may be set to '1' if the MPU has multiple MFUs. Also, no_mfu may be set to '1' if no MFU is included in the MPU data like in the case of file transfer.

Additionally, timing_flag may be used to correct the time stamp by indicating whether the current MFU belongs to the same access unit as the previous one if the previous packet is lost, codec_update_flag may be set to '1' if the payload has codec configuration information, header_first may be set to '1' if the payload starts at the header information of the media data, and event_list_flag may be set if the payload has an event list to be represented for the user. The event list may list events belonging to the content.

Also, multiple_aus_flag may be set to '1' if the payload contains multiple frames. If a codec such as Advanced Audio Coding (AAC) is used, units for in-band codec configuration may be included in the MPU element.

Furthermore, codec_update_flag may include codec_config_size indicating the size of codec configuration information and codec_config_data indicating the codec configuration information. According to an embodiment of the present disclosure, if a codec is changed based on the codec configuration information or if the codec configuration information is modified, at the beginning or in the middle of the multimedia streaming service, the presence/absence of the information may be set through the codec_update_flag. Also, downcounter may be used to indicate that a few more payloads containing the codec configuration information exist after the current payload, if the codec configuration information is divided into multiple payloads. As an example, if the codec configuration information is divided into multiple segments and downcounter is set to '3', a receiver may determine that payloads having downcounters of 2, 1 and 0 are later used to complete the codec configuration information. Upon receiving a payload of downcounter 0, the receiver may determine that the transmission of all payloads related to the codec configuration information is completed.

If event_list_flag is set, an event list to be delivered through a transmission unit may exist, and the event list may include num_events indicating the number of events and at least one event data. According to an embodiment of the present disclosure, if the event data that has already been transmitted is used, the event may be expressed by including only the event identifier 'event ID' instead of the event data. According to an embodiment of the present disclosure, event data may be transmitted in advance using a predetermined transport means before transmission of the payload. Listed events may be executed after being synchronized with the display of the frame. According to an embodiment of the present disclosure, audio may be optionally changed through the event list during playback of video data.

If multiple_mfu_flag is set, num_MFUs indicating how many MFUs the payload has may exist in the MPU element. If multiple_mfu_flag is not set, num_MFUs is set to '1', and header_first and multiple_au_flag are set to '0'. According to an embodiment of the present disclosure, if a multimedia data unit desired to be transmitted has multiple frames, or multiple slices in a single frame, the information for setting the number of multiple entities may be set.

If timing_flag is set, timing information for units in the MPU may be included in the MPU element.

Additionally, as many MFUs as num_MFUs may be listed in the MPU element. Since the order of MFUs may be different from the order of decoder inputs, decode_order_number may indicate the order that the MFU is input to the decoder and may be optionally included.

If multiple_mfu_flag is set to '1', mfu_size indicating the size of each MFU may be further included. In the present disclosure, it is assumed that the MFUs that are input to the data configuration unit have the same size.

If headers_first is not set to '1', one mmt_mfu_element( ) may be included.

If headers_first is set to '1', as many mmt_mfu_element( ) as num_MFUs may be included in the MPU element.

The receiver, which may be a physical element, unit, and/or device, configured in accordance with an embodiment of the present disclosure may include a reception unit configured to receive a multimedia data packet from a counterpart entity, and an interpretation unit configured to extract and interpret at least one MFU or MPU included in the multimedia data packet or at least a part thereof depending on the above-described format of the MMT payload.

According to an embodiment of the present disclosure, at least one of the data generation unit, the data configuration unit, the data transmission unit, the receiver, the reception unit, and the interpretation unit may include at least one hardware element. It can be seen that the methods and operations of the various embodiments of the present disclosure can be implemented in the form of hardware, software, or a combination of hardware and software. Such an arbitrary software may be stored in, for example, irrespective of being erasable or rewritable, a volatile or non-volatile storage device such as a Read-Only Memory (ROM), a memory such as a Random Access Memory (RAM), a memory chip device, a processor, a computer chip, Erasable Programmable ROM (EPROM), an Integrated Circuit (IC), an optically or magnetically recordable and a machine readable, e.g., a computer readable, storage medium such as a Compact Disc (CD), a Digital Versatile Disc (DVD), a magnetic disk, or a magnetic tape. It can be also appreciated that the memory included in the mobile terminal is one example of machine-readable devices suitable for storing a program including instructions that are executed by a processor device to thereby implement various embodiments of the present disclosure. Accordingly, the present disclosure may include a program including a code for implementing a device and a method described in an arbitrary claim of the present specification, and a machine readable, e.g., a computer readable, storage medium storing such a program. Furthermore, such a program may be electronically transferred through an arbitrary medium such as a communication signal transferred through a wired or wireless connection, and the present disclosure may appropriately include equivalents thereof.

The above-described format of the MMT payload may enable the efficient delivery and aggregation/fragmentation of MPUs and MFUs.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for transmitting media content in a multimedia system, the method comprising:
generating one or more multimedia data packets based on a data unit, the data unit being fragmented into at least one sub data unit, each multimedia data packet including a packet header and a payload; and
transmitting the generated one or more multimedia data packets,
wherein each of the generated one or more multimedia data packets comprise type information indicating whether a respective payload data included in a payload of a given multimedia data packet comprises either a metadata of the data unit or a data element derived from the at least one sub data unit,
wherein the type information comprises a first value indicating that the respective payload data comprises the metadata of the data unit if the respective payload data comprises the metadata of the data unit, and
wherein the type information comprises a second value indicating that the respective payload data comprises the data element derived from the at least one sub data unit if the respective payload data comprises the data element derived from the at least one sub data unit.

2. The method of claim 1, wherein the metadata of the data unit comprises information regarding configuration of the at least one sub data unit.

3. The method of claim 1, wherein the metadata of the data unit comprises a box having codec configuration information.

4. The method of claim 1, wherein the type information is included in the packet header of the respective multimedia data packet.

5. The method of claim 1, wherein the payload of the given multimedia data packet further comprises a fragmentation indicator indicating that the payload is one of a set including a start, a middle or an end of the data unit.

6. The method of claim 1, wherein the metadata of the data unit comprises one of file type information of the data unit, movie fragment metadata of the data unit or a motion picture experts group (MPEG) media transport (MMT) processing unit (MMPU) box being placed after the file type information to provide information regarding to the data unit.

7. The method of claim 1, wherein the respective multimedia data packet comprises information identifying an asset to which the payload data included in the respective multimedia data packet belongs.

* * * * *